United States Patent [19]
Hassett et al.

[11] Patent Number: 5,547,588
[45] Date of Patent: Aug. 20, 1996

[54] ENHANCED ETTRINGITE FORMATION FOR THE TREATMENT OF HAZARDOUS LIQUID WASTE

[75] Inventors: David J. Hassett; Jeffrey S. Thompson, both of Grand Forks, N. Dak.

[73] Assignee: Gas Research Institute, Chicago, Ill.

[21] Appl. No.: 328,894

[22] Filed: Oct. 25, 1994

[51] Int. Cl.$^6$ ................................................ C02F 1/62
[52] U.S. Cl. .................. 210/724; 210/911; 210/912; 210/913; 423/128; 423/58; 423/65; 423/87; 423/276; 423/115
[58] Field of Search ................... 210/724, 911, 210/912, 913; 423/122, 127, 128, 55, 58, 65, 87, 276, 115

[56] References Cited

U.S. PATENT DOCUMENTS

| | | |
|---|---|---|
| 3,663,252 | 5/1972 | Stiglitz et al. . |
| 3,720,609 | 3/1973 | Smith et al. . |
| 3,992,220 | 11/1976 | Baudouin et al. . |
| 4,002,484 | 1/1977 | Baudouin . |
| 4,118,243 | 10/1978 | Sandesara ........................... 210/751 |
| 4,124,405 | 11/1978 | Quienot ............................. 210/751 |
| 4,132,558 | 1/1979 | Uchikawa et al. . |
| 4,140,540 | 2/1979 | Caspar et al. . |
| 4,354,876 | 10/1982 | Webster . |
| 4,377,483 | 3/1983 | Yamashita et al. .................. 210/751 |
| 4,671,897 | 6/1987 | Mori et al. . |
| 4,741,776 | 5/1988 | Bye et al. . |
| 4,775,495 | 10/1988 | Izumida et al. . |
| 4,804,521 | 2/1989 | Rochelle et al. . |
| 4,931,264 | 6/1990 | Rochelle et al. . |
| 4,948,516 | 8/1990 | Fisher et al. ...................... 210/751 |
| 5,100,643 | 3/1992 | Brna et al. . |
| 5,130,051 | 7/1992 | Falk ............................... 210/751 |
| 5,173,284 | 12/1992 | Moisset et al. . |
| 5,202,062 | 4/1993 | Baba et al. . |

OTHER PUBLICATIONS

Hassett, David J. et al., "Fixation of Trace Elements by Ettringite; a Screening Study", Energy and Environmental Research Center, Mining and Mineral Resources Research Institute, University of North Dakota, Grand Forks, ND, Sep. 1991.

*Primary Examiner*—Neil McCarthy
*Attorney, Agent, or Firm*—Speckman, Pauley & Fejer

[57] ABSTRACT

A process for treatment of hazardous liquid waste comprising trace amounts of hazardous elements in solution as oxyanions by oxyanion fixation within ettringite and related minerals. In accordance with the disclosed process, reagents for forming ettringites are mixed with the waste stream resulting in the formation of oxyanion-substituted ettringite and related materials. The resulting ettringite and related minerals are separated by filtration from the liquid. Thereafter, the liquid, having an elevated pH, is neutralized by carbon dioxide sparging resulting in precipitation of excess reagents in the liquid. Thereafter, the precipitates are filtered, producing a clean liquid.

11 Claims, 1 Drawing Sheet

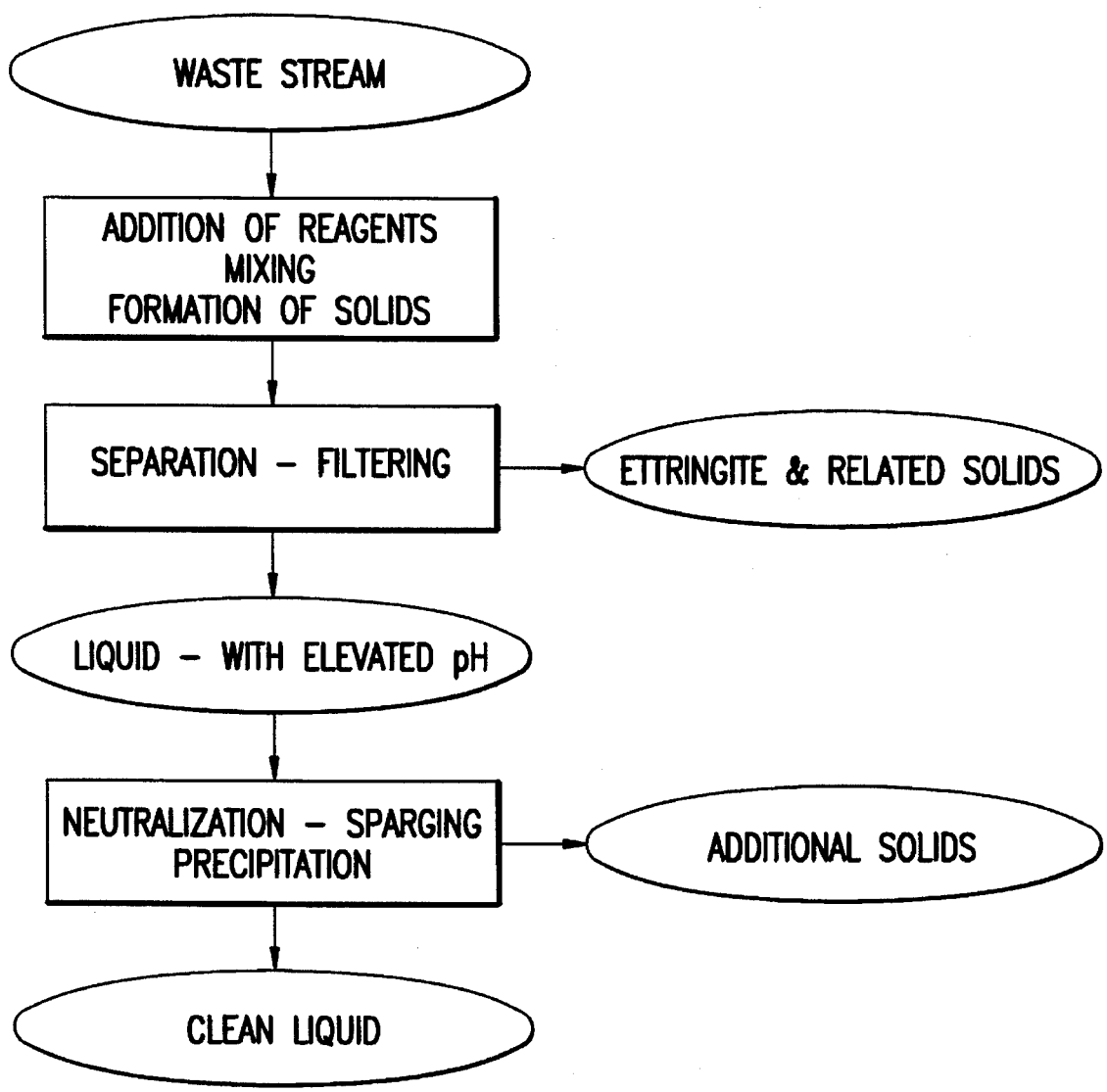

ENHANCED ETTRINGITE FORMATION FOR THE TREATMENT OF HAZARDOUS LIQUID WASTE

BACKGROUND OF THE INVENTION

1. Field of the Invention

This invention relates to a process and apparatus for treatment of hazardous liquid wastes through enhanced ettringite formation, in particular, to control solubility of toxic trace elements such as arsenic, boron, chromium, molybedenum, selenium, and vanadium, as well as other elements that exist as oxyanions in an aqueous solution. More particularly, this invention relates to a process and apparatus for promoting the formation of substituted ettringite and related materials for the purpose of stabilizing potentially hazardous oxyanions as water-insoluble solids.

2. Description of Prior Art

Natural gas industry operations can generate wastes with elevated concentrations of arsenic, boron, chromium, molybenum, selenium, and vanadium. In addition, coal conversion solid wastes from coal gasification and other related processes generally contain elevated amounts of arsenic, boron, molybdenum, and selenium. Arsenic, chromium, and selenium are hazardous elements regulated by the U.S. Environmental Protection Agency; boron is toxic to plants when present in elevated concentrations in irrigation water; and molybdenum is likewise toxic. If mobilized in the environment, these potentially problematic elements are typically present in solution as oxyanions. Ettringite is both an individual mineral, calcium aluminosulfate hydroxide hydrate, $Ca_6Al_2(SO_4)_3(OH)_{12}.26H_2O$, and the group name for a series of chemically analogous isostructural compounds. One example of a naturally occurring boron—containing ettringite is charlesite, $Ca_6Al_2(SO_4)_2(B(OH)_4)(OH,O)_{12}.26H_2O$. In this compound, one of the sulfate anions has been replaced with a $B(OH)_4$ oxyanion. Thus, these calcium aluminosulfate hydroxide hydrate minerals in which sulfate can be substituted by other oxyanions, such as those listed hereinabove, represent one potential solution for the environmentally responsible handling and disposal of hazardous liquid wastes. The incorporation of these oxyanionic elements into ettringite phases through the addition of ettringite-forming materials at the time of disposal, or by injection after disposal for remediation, is a practical and inexpensive means of mitigating problems with disposal of hazardous liquid wastes containing these trace elements.

Ettringites are naturally occurring compounds. The nominal conditions for the synthesis of ettringite in the laboratory include a pH between 11 and 13 and stoichiometric amounts of calcium, aluminum, and sulfate. Although ettringite can be easily synthesized in the laboratory, nominal conditions for ettringite synthesis do not result in efficient removal of trace amounts of potentially problematic oxyanions such as those listed hereinabove. See Hassett, David J. et al., "Fixation of Trace Elements by Ettringite; a Screening Study", Energy and Environmental Research Center, Mining and Mineral Resources Research Institute, University of North Dakota, Grand Forks, Md., September 1991. In addition, we have determined that, although the formation of ettringite to remove oxyanions occurs naturally, the efficiency of removal is low, on the order of less than 15%. Thus, in order for ettringite formation to be effective in removing oxyanions, the ettringite must be formed in a manner which promotes fixation of substantially all of the oxyanions.

Methods for forming ettringites are generally taught by U.S. Pat. No. 3,992,220 in which white Portland cement is hydrated with water in excess of that needed for hydration, agitated, and subsequently combined with hydrated aluminum sulfate; U.S. Pat. No. 4,002,484 in which a substantially stoichiometric mixture of calcic aluminate and calcium sulfate, formed at a temperature in the range of about 20° C. to 90° C., is hydrated simultaneously, water being added at least in stoichiometric proportions for the reaction and at maximum in an amount such that after the reaction the product is obtained containing 5% (dry) ettringite and 95% (by weight) water; and related U.S. Pat. No. 4,140,540 in which ettringite is formed in accordance with the process of the '484 patent but with enough water to assure having a suspension containing a maximum of 25% dry matter at the end of the reaction, and in subjecting the suspension to moderate stirring of 1 to 5 times the force necessary to maintain a homogenous suspension.

Fixation or encapsulation of radioactive liquid waste by solidifying the radioactive liquid waste within an organic solidifier is taught by U.S. Pat. Nos. 4,671,897, 4,775,495, and 5,202,062. However, each of these references suggests that ettringites are not suitable for use in disposing of radioactive waste by solidification on the basis that the resulting solidified package tends to break, resulting in leakage of the radioactive nuclides.

Related U.S. Pat. Nos. 4,804,521, 4,931,264, and 5,100,643 all teach processes for treating acid gases to remove acid gas components, such as sulfur/oxides, therefrom. The '521 patent and the '264 patent both teach preparation of an aqueous slurry composed of a calcium alkali source and a source of reactive silica and/or alumina, heating the slurry to above-ambient temperature for a period of time in order to facilitate the formation of sulfur-absorbing calcium silicas or aluminates and treating the gas with the heat treated slurry components. The '643 patent teaches preparation of a calcium silicate hydrate sorbent in the form of a semi-dry, free-flowing powder, and treating the gas with the powdery sorbent, such as by injecting the sorbent into a stream of the gas.

U.S. Pat. No. 3,663,252 teaches a process for stabilization of aluminous cements in which a substance is added to an anhydrous cement mixture to prevent the formation of cubic aluminate and free water in the cement.

U.S. Pat. No. 3,720,609 teaches a process for treating waste sludges by adding to the sludges materials capable of producing aluminum ions, lime and/or sulfate-bearing compounds and hardening the resulting composition. Hardening occurs over time by formation of calcium sulfo-aluminate hydrates that is, ettringites. Similarly, U.S. Pat. No. 4,132,558 teaches a process for treating sludges or drainages containing chromium compounds by treatment of the sludge or drainage with a rapid hardening cement containing calcium haloaluminate; and U.S. Pat. No. 4,741,776 teaches a process for treating waste streams containing heavy metals by treating the material with flue dust and bonding it to form a solid mass with cement powder.

SUMMARY OF THE INVENTION

It is an object of this invention to provide a process for treatment of hazardous liquid wastes having trace amounts of hazardous elements, such as arsenic, boron, chromium, molybdenum, selenium, and vanadium, that exist as oxyanions in aqueous solutions by stabilizing said hazardous oxyanions as water-insoluble solids.

It is another object of this invention to provide a process for treatment of hazardous liquid wastes containing toxic trace elements such as boron, selenium, sulfur, chromium, arsenic, molybdenum, and vanadium which are present in solution as oxyanions to produce useable, that is potable or irrigation, water and a minimal mass of solid waste containing the hazardous elements.

It is yet another object of this invention to provide a process for fixation of potentially hazardous trace elements, such as boron, selenium, sulfur, chromium, arsenic, molybdenum, and vanadiunm by formation of suitable ettringites.

These and other objects of this invention are achieved by a process for treatment of a hazardous liquid waste comprising the steps of mixing the hazardous liquid waste with a stoichiometric excess of calcium required for formation of ettringite, a stoichiometric excess of aluminum required for formation of said ettringite, and a stoichiometric deficiency of sulfate required for formation of said ettringite, to form a solid comprising ettringite and at least one fixated oxyanion and a liquid. By the term "fixed oxyanion" we mean an oxyanionic component chemically incorporated into said ettringite structure. Thereafter, the solid and the liquid are separated by known techniques, such as filtering, centrifugation, or gravitational separation. The separated liquid, having a pH of about 11 to about 13 is neutralized by sparging with carbon dioxide resulting in the precipitation of excess aluminum, as amorphus aluminum hydroxide, and the precipitation of excess calcium, as calcite. The precipitates produced by the neutralization step are separated from the liquid, leaving a clean liquid. The solid comprising said at least one fixated oxyanion is selected from the group consisting of ettringite, monophase, portlandite, calcite, gypsum, and mixtures thereof.

The process of this invention may be conducted on a batch or continuous basis and will vary slightly depending upon the particular trace elements to be fixated. Thus, for example, for treatment of waste streams containing selenium, a first portion of the hazardous liquid waste stream is mixed with a stoichiometric excess of calcium required for formation of ettringite, forming a first mixture. A second portion of the hazardous liquid waste is mixed with a stoichiometric excess of aluminum and a stoichiometric deficiency of sulfate required for formation of the ettringite, forming a second mixture. The second mixture is slowly added to the first mixture, forming a third mixture comprising a liquid and a solid comprising ettringite and a mineral selected from the group consisting of, monophase, portlandite, calcite, gypsum, and mixtures thereof. Thereafter, the solid and liquid are separated by known methods.

For treatment of liquid waste streams containing both selenium and boron, the liquid waste stream is mixed with a stoichiometric excess of calcium and a stoichiometric deficiency of sulfate required for formation of ettringite, forming a first mixture. Deionized water is mixed with a stoichiometric excess of aluminum required for formation of ettringite, forming a second mixture. Thereafter, the second mixture is added in stages to, for example, a tube reactor carrying a stream of the first mixture, the addition of the second mixture at a first stage thereof forming ettringite under suitable conditions for promoting the fixation of boron and the addition of the second mixture at a second stage thereof forming monophase under conditions suitable for promoting the fixation of selenium.

In each embodiment of the process of this invention, removal of the hazardous elements is greater than 99% effective.

BRIEF DESCRIPTION OF THE DRAWINGS

This invention will be better understood from the following detailed description taken in conjunction with the drawing which shows a schematic flow diagram of the enhanced ettringite formation process in accordance with this invention.

DESCRIPTION OF PREFERRED EMBODIMENTS

The nominal conditions for ettringite synthesis include a pH between 11 and 13 and stoichiometric amounts of calcium, aluminum, and sulfate. Although ettringite can be easily synthesized in the laboratory, nominal conditions for ettringite synthesis do not always result in efficient removal of trace amounts of potentially problematic oxyanions. In addition, the conditions for optimum oxyanion incorporation do not necessarily correspond to the conditions required for maximum ettringite formation and are different from nominal stoichiometric conditions for the formation of ettringite. The stabilization of trace elements is achieved in accordance with the process of this invention by adjusting crucial parameters for formation of ettringite such as aluminum, calcium, hydroxide, and sulfate concentrations.

The product of the process of this invention is clean potable water or water suitable for irrigation. The process in its application results in the formation of two solid by-products. The main by-product is a relatively small mass of solid comprising ettringite and related minerals, such as monophase, portlandite, calcite, and gypsum, which also contain the potentially problematic trace elements removed from the hazardous liquid waste treated in accordance with this process. The formulas for these minerals are as follows:

| | |
|---|---|
| Ettringite | $Ca_6Al_2(SO_4)_3(OH)_{12}.26H_2O$ |
| Monophase | $Ca_4Al_2SO_4(OH)_{12}.6H_2O$ |
| Portlandite | $Ca(OH)_2$ |
| Calcite | $CaCO_3$ |
| Gypsum | $CaSO_4.2H_2O$ |

The second solid by-product of the process of this invention is a very small mass of calcite and amorphous aluminum hydroxide.

The figure shows a schematic diagram of the flow chart for the enhanced ettringite formation process of this invention, the process utilizing common unit processes in a series of steps. As shown, the waste stream to be treated, containing trace amounts of potentially hazardous elements typically present in solution in an oxyanionic form or as other complex ions involving oxyanionic species, is combined with reagents and mixed to form oxyanion-substituted ettringites and related solids containing said potentially hazardous trace elements. The solids are separated from the liquid in the waste stream by filtering or by some other suitable separation means, leaving a liquid having an elevated pH. A pH above about 11 is necessary for the formation and complete stabilization of ettringite. When equilibrated at pH's below about 11, sulfate, selenate, and borate ettringites dissolve incongruently into aluminum—rich solids and dissolve components. Dissolution is complete between a pH of 1 and 2. The elevated pH liquid is neutralized, for example by sparging with $CO_2$, resulting in precipitation of additional solids which are subsequently separated from the liquid, thus producing a clean liquid.

More particularly, reagents in the form of a stoichiometric excess of calcium, a stoichiometric excess of aluminum, and a stoichiometric deficiency of sulfate including the summation of sulfate and other competing oxyanions, are added to the waste stream and mixed, resulting in the formation of oxyanionic-substituted ettringite and related minerals, such as monophase. Thereafter, the oxyanionic-substituted ettringite and related minerals are separated from the liquid phase of the waste stream. Such separation may be by filtration, centrifugation, gravity, or other suitable means. The resulting liquid, having an elevated pH in the range of about 11 to 13, is neutralized, for example by sparging with carbon dioxide, resulting in precipitation of excess aluminum in the form of amorphus aluminum hydroxide and excess calcium in the form of calcite. These precipitates are separated from the liquid phase, producing a clean liquid having elemental concentrations of potentially hazardous oxyanions below the limits set for drinking water.

As stated hereinabove, formation of oxyanionic-substituted ettringite is known to occur naturally, albeit at a very low efficiency. We have determined that efficient oxyanion incorporation into ettringite and related minerals in accordance with the process of this invention requires pH control in the range of about 11 to 13, a stoichiometric excess of calcium, a stoichiometric excess of aluminum, and a stoichiometric deficiency of sulfate, including the summation of sulfate and other competing oxyanions, for the mass of ettringite of being formed, and a correct mass of ettringite to a volume of liquid waste, adjusted for optimal mass of ettringite formed for existing concentrations of oxyanions. Also required are proper removal of the oxyanion-substituted ettringite and related materials from the treated waste stream and proper treatment of the remaining liquid to render it non-hazardous, namely by removal of excess reagents used in the process for ettringite formation.

In accordance with one embodiment of the process of this invention, calcium is provided in the form of CaO, aluminum is provided in the form of $NaAlO_2$ and sulfate is provided in the form of $H_2SO_4$ and/or $Na_2SO_4$.

EXAMPLE I

The process for removal of selenium in accordance with one embodiment of this invention was applied to a waste stream having a concentration of about 10 mg/l of selenium resulting in greater than 99% removal of selenium from the waste stream. In particular, 1.85 grams of CaO were added to 300 mL of the waste stream and maintained in suspension by continuous stirring. This mass of CaO is not completely soluble in the volume of water used. 0.71 grams of $Na_2SO_4$ and 1.43 grams of $NaAlO_2$ were added to a 100 mL portion of the waste stream and mixed until dissolved. Thereafter, the sulfate and aluminum containing solution were added slowly, at a rate of about 5 mL per minute, to the calcium-containing mixture while stirring to produce a mixture of selenium-incorporated monophase and liquid. The resulting mixture of solid and liquid was then filtered to separate the solid from the liquid.

EXAMPLE II

The process for removal of boron in accordance with another embodiment of this invention was applied to a waste stream comprising a starting concentration of about 20 mg/L of boron and resulted in greater than 99% removal of said boron. In particular, 1.85 g CaO were added to a 300 mL portion of the waste stream and maintained in suspension by continuous stirring. 2.13 g $Na_2SO_4$ and 0.82 g $NaAlO_2$ were added and mixed until dissolved in a 100 mL portion of the waste stream. The sulfate and aluminum containing waste stream were added slowly, at a rate of approximately 5 mL per minute, to the calcium-containing solution while stirring. The resulting mixture of solid and liquid was then filtered.

The method for continuous processing of waste streams in accordance with one embodiment of the process of this invention utilizes ratios of reagents and solutions similar to those shown in Examples I and II. The use of the waste stream as the solvent for all reagents is done to avoid the use of water which would further increase volumes of materials.

EXAMPLE III

The process for removal of both boron and selenium in accordance with yet another embodiment of this invention was applied to a waste stream containing selenium and boron as follows. Solutions containing boron and selenium were treated in a step wise fashion, forming ettringite for the removal of boron followed by formation of monophase for the removal of selenium. A staged reactor was employed for purposes of this example.

In particular, 13.88 g CaO were added to a 3 L portion of the waste stream comprising a solution containing 10 mg/L each of selenium and boron and kept in suspension by continuous stirring. 2.10 mL of concentrated $H_2SO_4$ were added as a source of sulfate. To a 184 mL portion of deionized water, 9.22 g $NaAlO_2$ were added and mixed until dissolved. The aluminum-containing deionized water solution was added in two stages to a tube reactor through which was following the calcium- and sulfate-containing waste stream at a rate of approximately 103 mL per minute. The deionized water solution was added at a first addition port of the tube reactor at a rate of approximately 2.11 mL per minute forming ettringite under conditions suitable for promoting the fixation of boron. Thereafter, a second portion of the deionized water solution was added at a second addition port downstream of said first addition port at a rate of approximately 4.21 mL per minute, forming monophase under conditions suitable for promoting the fixation of selenium.

In each of the examples cited hereinabove, the additional steps necessary to complete the enhanced ettringite formation process in accordance with this invention comprise neutralization of the resulting liquid, preferably by sparging with carbon dioxide, which results in the precipitation of excess aluminum as amorphus aluminum hydroxide and excess calcium as calcite. The resulting precipitates are then filtered, producing a clean liquid.

The enhanced ettringite formation process in accordance with this invention has been effectively used for the removal of boron, selenium, and chromium over a board range of concentrations. However, it may be effectively applied to virtually any oxyanions of trace hazardous elements in liquid waste streams.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for treatment of hazardous liquid wastes comprising oxyanions of at least one element selected from the group consisting of boron, selenium, chromium, arsenic, molybdenum and vanadium, the process comprising the steps of:

mixing a first portion of a hazardous liquid waste for treatment with a stoichiometric excess of calcium required for formation of ettringite, forming a first mixture;

mixing a second portion of said hazardous liquid waste with a stoichiometric excess of aluminum and a stoichiometric deficiency of sulfate required for formation of said ettringite, forming a second mixture;

adding said second mixture to said first mixture, forming a third mixture comprising a liquid portion and a solid comprising ettringite and at least one fixed oxyanion of said element; and separating said liquid portion and said solid.

2. A process in accordance with claim 1, wherein the pH of said liquid portion is between about 11 and about 13.

3. A process in accordance with claim 2, wherein said liquid portion is neutralized by sparging with carbon dioxide, forming an amorphous aluminum hydroxide precipitate and a calcite precipitate.

4. A process in accordance with claim 3, wherein said amorphous aluminum hydroxide precipitate and said calcite precipitate are separated from said liquid portion, producing a clean liquid.

5. A process for treatment of a hazardous liquid waste comprising at least one oxyanion of at least one element selected from the group consisting of boron, selenium, chromium, arsenic, molybdenum and vanadium, the process comprising the steps of:

mixing said hazardous liquid waste with a stoichiometric excess of aluminum required for formation of said ettringite and a stoichiometric deficiency of sulfate required for formation of said ettringite, forming a solid comprising said ettringite and at least one fixed oxyanion of said at least one element, and a liquid; and separating said solid from said liquid.

6. A process in accordance with claim 5, wherein said solid further comprises a mineral selected from the group consisting of monophase, portlandite, calcite, gypsum and mixtures thereof.

7. A process in accordance with claim 5, wherein the pH of said liquid is between about 11 and about 13.

8. A process in accordance with claim 5, wherein said calcium is in the form of CaO, said aluminum is in the form of $NaAlO_2$, and said sulfate is selected from the group consisting of $H_2SO_4$, $Na_2SO_4$ and mixtures thereof.

9. A process in accordance with claim 7, wherein said liquid is neutralized by sparging with carbon dioxide, forming an amorphous aluminum hydroxide precipitate and a calcite precipitate and a clean liquid.

10. A process in accordance with claim 8, wherein said mixing of said hazardous liquid waste with said CaO, said $NaAlO_2$ and said sulfate is carried out in stages, said hazardous liquid waste being mixed with said CaO and said sulfate, forming a first mixture, and said first mixture being mixed with a first portion of a second mixture comprising deionized water and said $NaAlO_2$ followed by a second portion of said second mixture.

11. A process in accordance with claim 10, wherein said process is carried out in a tube reactor, said first mixture flowing through said tube reactor and said second mixture being introduced into an upstream end of said tube reactor and a downstream end of said tube reactor for mixing with said first mixture.

* * * * *